United States Patent
Toyomura et al.

(10) Patent No.: US 6,753,692 B2
(45) Date of Patent: Jun. 22, 2004

(54) METHOD AND APPARATUS FOR TESTING SOLAR PANEL, MANUFACTURING METHOD FOR MANUFACTURING THE SOLAR PANEL, METHOD AND APPARATUS FOR INSPECTING SOLAR PANEL GENERATING SYSTEM, INSULATION RESISTANCE MEASURING APPARATUS, AND WITHSTAND VOLTAGE TESTER

(75) Inventors: Fumitaka Toyomura, Kyoto (JP); Naoki Manabe, Kanagawa (JP); Nobuyoshi Takehara, Kyoto (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/816,447

(22) Filed: Mar. 26, 2001

(65) Prior Publication Data

US 2001/0040453 A1 Nov. 15, 2001

(30) Foreign Application Priority Data

Mar. 29, 2000 (JP) .................................. 2000-091718
Jan. 26, 2001 (JP) .................................. 2001-018098

(51) Int. Cl.[7] .......................... G01R 27/08; H01H 31/12
(52) U.S. Cl. ...................................... 324/718; 324/551
(58) Field of Search ............................... 324/551, 718; 363/56.03; 136/251; 361/252, 290

(56) References Cited

U.S. PATENT DOCUMENTS

| 5,712,572 | A | * | 1/1998 | Tamechika | ................. 324/551 |
| 6,204,443 | B1 | * | 3/2001 | Kiso et al. | ................. 136/259 |
| 6,300,555 | B1 | * | 10/2001 | Kondo et al. | ............... 136/244 |
| 6,300,556 | B1 | * | 10/2001 | Yamagishi | ................. 136/251 |
| 2001/0048605 | A1 | * | 12/2001 | Kurokami | ............... 363/56.03 |

FOREIGN PATENT DOCUMENTS

| JP | 07-235685 | * | 9/1995 |
| JP | 11-274522 | * | 10/1999 |

* cited by examiner

Primary Examiner—Anjan K. Deb
Assistant Examiner—John Teresinski
(74) Attorney, Agent, or Firm—Fitzpatrick, Cella, Harper & Scinto (57) ABSTRACT

A manufacturing method for manufacturing a solar panel including a solar cell and an outer housing and an inspection method for inspecting a solar panel generating system, include a step of performing one of a withstand voltage test and an insulation resistance test between a live electrical section electrically connected to the solar cell and a conductor section of the outer housing, and thereafter a step of applying a voltage between the live electrical section and the conductor section. In this way, a residual charge left subsequent to the withstand voltage test or the insulation resistance test is reliably removed within a short period of time.

20 Claims, 8 Drawing Sheets

METHOD AND APPARATUS FOR TESTING SOLAR PANEL, MANUFACTURING METHOD FOR MANUFACTURING THE SOLAR PANEL, METHOD AND APPARATUS FOR INSPECTING SOLAR PANEL GENERATING SYSTEM, INSULATION RESISTANCE MEASURING APPARATUS, AND WITHSTAND VOLTAGE TESTER

BACKGROUND OF THE INVENTION

1. Field of the Invention

The present invention relates to a test method and a test apparatus for performing a withstand voltage test or an insulation resistance test between a live electrical section electrically connected to a solar cell and an outer housing conductor section of the solar cell in a photovoltaic solar panel. The present invention also relates to a manufacturing method for manufacturing the solar panel, an inspection method and an inspection apparatus for a solar panel generating system, an insulation resistance measuring apparatus, and a withstand voltage tester for use in the test apparatus, and the inspection apparatus.

2. Description of the Related Art

As people become more ecology conscious, public expectations for solar panels, which use clean energy, increase. Solar panel integrated building material modules, into which a solar panel and a building material are integrated, draw particular attention. "Integrated roof solar panel modules" and "integrated wall solar panel modules" have been actively developed. These modules are increasingly used as roofs and walls of homes or buildings, year by year.

Figure 2:
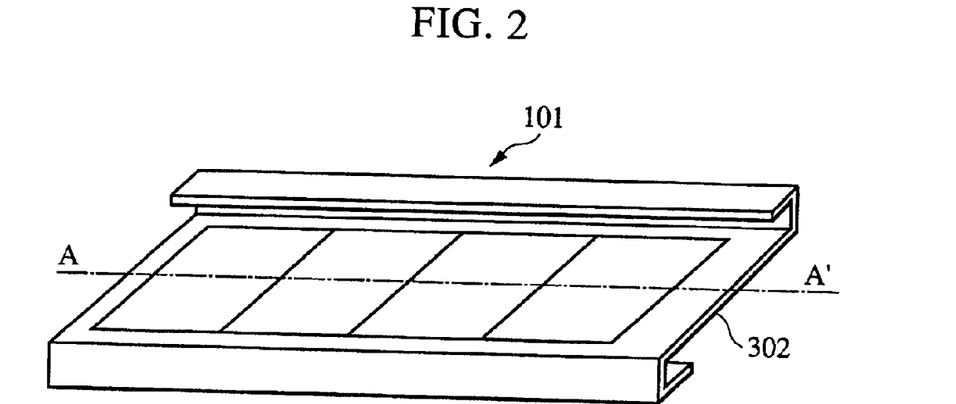
FIG. 2 diagrammatically shows the solar panel of FIG. 1.
Figure 3:
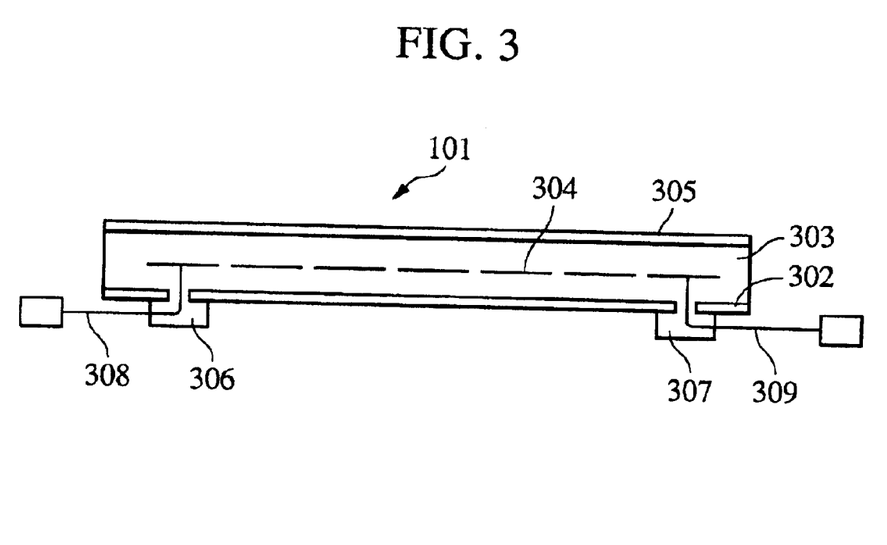
FIG. 3 is a sectional view of the solar panel of FIG. 2.

Referring to rough sectional views shown in FIG. 2 and FIG. 3, these known integrated solar panel modules employ a steel plate on the bottom side thereof for reinforcement or a metal frame surrounding the panel for easy installation. A plurality of these panel modules are installed, thereby forming an array of solar panels. A plurality of arrays are connected at a junction box to collect electricity. Using an inverter, generated direct current power is converted into an alternating current power to be used across a load or to be fed back to a power line.

When the solar panel modules, not limited to the integrated solar panel modules, are manufactured, at least one of an insulation resistance test and a withstand voltage test is performed to test insulation performance and withstand voltage performance between a conductor section (a live electrical section) connected to a solar cell and a conductor section of an outer housing. Thereafter, a voltage difference takes place between the solar cell and the outer housing in the solar panel module. To quickly reduce the voltage difference, the conductor section of the outer housing is shorted.

If an attempt is made to short the live electrical section electrically connected to the solar cell, a residual charge occurs again subsequent to the removal of a shorting wire. A discharge could occur between the live electrical section electrically connected to the solar cell and the conductor section of the outer housing, thereby occasionally breaking down the solar cell itself. It is believed that a voltage difference occurs again due to the generation of a charge attributed to dielectric polarization in a material filling the solar cell. The method of shorting the live electrical section momentarily reduces the voltage difference therebetween. After the shorting circuit is opened, a residual charge occurs again, thereby causing a voltage difference therebetween.

During a maintenance service of a solar panel generating system, an insulation resistance measurement may be performed on a solar array one by one. When one solar panel array is measured after the measurement of another, a residual charge occurs in the solar panel array or in the solar panel module as a result of the preceding measurement, and a precise measurement of insulation resistance becomes difficult. As a preventive step for resolving this problem, a shorting wire may be connected between the live electrical section connected to the solar cell and a terminal connected to the conductor section of the outer housing (for example, a ground terminal) to lower the potential. During this operation, however, an arc may develop as a result of discharging. After removal of the shorting wire, a residual charge may occur again.

When an insulation resistance measuring apparatus having an automatic discharging function is employed, an accumulated charge is drained if a measuring probe is left connected. A subsequent removal of the probe can cause a voltage difference again.

Another method is simply waiting until the charge is self-discharged. However, this takes a substantially long period of time.

SUMMARY OF THE INVENTION

In view of the above problems, it is an object of the present invention to provide a test method and a test apparatus for testing a solar panel in a manner such that a residual charge from an insulation resistance test or a withstand voltage test is reliably removed within a short period of time, a manufacturing method for manufacturing the solar panel, an inspection method and an inspection apparatus for a solar panel generating system, and an insulation resistance measuring apparatus and a withstand voltage tester.

A test method of the present invention for testing a solar panel including, at least, both a solar cell and an outer housing, includes a step of performing one of a withstand voltage test and an insulation resistance test between a live electrical section electrically connected to the solar cell and a conductor section of the outer housing, and a step of applying a voltage between the live electrical section and the conductor section after the one of the withstand voltage test and the insulation resistance test has been performed.

An inspection method of the present invention for inspecting a solar panel generating system including a solar panel including, at least, both a solar cell and an outer housing, includes a step of performing one of a withstand voltage test and an insulation resistance test between a live electrical section electrically connected to the solar cell and a conductor section of the outer housing, and a step of applying a voltage between the live electrical section and the conductor section after the one of the withstand voltage test and the insulation resistance test has been performed.

A test apparatus of the present invention for testing a solar panel including, at least, both a solar cell and an outer housing, includes a unit for performing one of a withstand voltage test and an insulation resistance test between a live electrical section electrically connected to the solar cell and a conductor section of the outer housing, and a unit for applying a voltage between the live electrical section and the conductor section after the one of the withstand voltage test and the insulation resistance test has been performed.

An inspection apparatus of the present invention for inspecting a solar panel generating system including a solar panel including, at least, both a solar cell and an outer housing, includes a unit for performing one of a withstand voltage test and an insulation resistance test between a live electrical section electrically connected to the solar cell and a conductor section of the outer housing, and a unit for applying a voltage between the live electrical section and the conductor section after the one of the withstand voltage test and the insulation resistance test has been performed.

A manufacturing method of the present invention for manufacturing a solar panel including, at least, a solar cell, a surface protective covering member for encapsulating the solar cell, and an outer housing, includes a step of encapsulating the solar cell with the surface protective covering member, a step of performing one of a withstand voltage test and an insulation resistance test between a live electrical section electrically connected to the solar cell and a conductor section of the outer housing, and a step of applying a voltage between the live electrical section and the conductor section after the one of the withstand voltage test and the insulation resistance test has been performed.

The voltage applied between the live electrical section and the conductor section is preferably an alternating current voltage. The outer housing is preferably a bottom surface reinforcement member for reinforcing the bottom surface of the solar panel. The solar panel preferably includes a metal plate. The metal plate is preferably a stainless steel sheet. The voltage applied between the live electrical section and the conductor section of the outer housing is preferably fed from a utility power line.

An insulation resistance measuring apparatus of the present invention includes a unit of applying a voltage across test terminals subsequent to an insulation resistance test.

A withstand voltage tester of the present invention includes a unit of applying a voltage across test terminals subsequent to a withstand voltage test.

During the manufacturing and testing of a solar panel, or during the inspection of a solar panel generating system, a withstand voltage test or an insulation resistance test is performed across test terminals between a live electrical section connected to a solar cell and an outer housing conductor in a solar panel using a withstand voltage tester and an insulation resistance measuring apparatus. A voltage difference occurs between the live electrical section and the conductor section of the outer housing, owing to a residual charge from these tests. The residual charge cannot be efficiently removed by techniques of shorting the live electrical section to the conductor section of the outer housing or of an automatic discharging function of a tester. The use of a self-discharge-phenomenon takes a long time before the residual charge is substantially reduced. In accordance with the present invention, a voltage is applied between the live electrical section and the conductor of the outer housing subsequent to the withstand voltage test or the insulation resistance test. The residual charge is thus quickly and effectively reduced.

Further objects, features, and advantages of the present invention will be apparent from the following description of the preferred embodiments with reference to the attached drawings.

DESCRIPTION OF THE PREFERRED EMBODIMENTS

Figure 1:
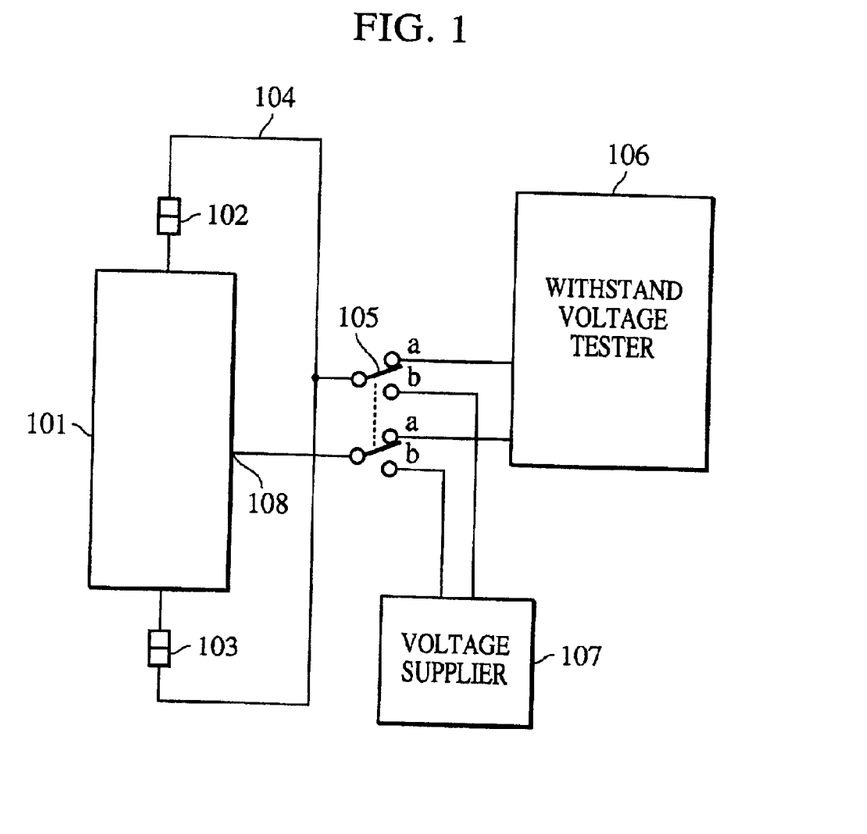
FIG. 1 is a block diagram of a setup for a withstand voltage testing of a solar panel in accordance with a first embodiment of the present invention.

FIG. 1 is a block diagram of a setup for a withstand voltage testing of a solar panel in a production system of the solar panel in accordance with a first embodiment of the present invention. As shown, in the withstand voltage setup, a positive connector 102 and a negative connector 103 in a solar panel 101 are shorted to each other through a shorting wire 104. The shorting wire 104 is also connected to a switch 105. A conductor section 108 of the solar panel 101 is electrically connected to the switch 105. A withstand voltage tester 106 connected to the switch 105 performs a withstand voltage test. Subsequent to the withstand voltage test, the switch 105 is turned to a voltage supplier 107 to supply the solar panel 101 with a voltage from the voltage supplier 107. Residual charge in the solar panel 101 is thus reduced. To perform an insulation resistance test, an insulation resistance measuring apparatus is used instead of the withstand voltage tester 106.

Discussed next are the solar panel 101, a padding material therewithin, an outer housing, a withstand voltage test, an insulation resistance test, and the voltage application method.

Solar Panel

The solar panel 101 includes, but is not limited to, a photovoltaic cell fabricated of silicon semiconductors, such as a monocrystal silicon solar cell, a polycrystal silicon solar cell, or an amorphous silicon solar cell, or a photovoltaic cell fabricated of compound semiconductors, such as a III-V group compound solar cell, a II-VI group compound solar cell, or a I-III-VI group compound solar cell. The present invention works well with a solar cell employing a metal plate.

The solar panel preferably employs an amorphous silicon solar cell formed on a stainless steel sheet. A weather-resistant transparent film is employed as a protective cover member, and a padding material encapsulates the cell. A bottom surface reinforcement member is preferably manufactured of a steel sheet of the same type which is occasionally used as a roof member for a building. The solar panel may be formed in the form of bent tile roofing, ribbed seam roofing, or horizontally aligned tile roofing.

Since the amorphous silicon solar cell is formed in a thin film over a film substrate or an electrically conductive substrate, the solar panel itself is relatively lightweight. The amorphous silicon solar cell thus works as a building material. Because of its structural strength and flexibility, the amorphous silicon solar cell having an electrically conductive substrate offers a high degree of freedom in shape and is adapted to a wide range of roofing and wall shapes.

Padding Material

A padding material of the photovoltaic solar panel covers surface irregularities of the photovoltaic solar cell, protects the cell from severe environments such as temperature variations, humidity, and mechanical shocks, and assures adhesion of the cell to a transparent film or glass. Thus, weather resistance, adhesion, filling property, heat resistance, low temperature resistance, and shock proofness are required of the padding material. Resins meeting these requirements include polyolefin-based resins, such as ethylene-vinyl acetate copolymer (EVA), ethylene methyl acrylate copolymer (EMA), ethylene ethyl acrylate copolymer (EEA), and butyral resin, polyurethane resins, and silicone resins. For its balanced property in the solar panel application, the EVA in particular is preferred as the padding material. Since the EVA is subject to deformation or creep under high temperatures because of the low heat deformation temperature thereof, the EVA is preferably cross-linked to increase temperature resistance.

An ultraviolet absorption agent is preferably added to the padding material. A known compound may be used for the ultraviolet absorption material. A low-volatility ultraviolet absorption agent is preferred in consideration of operational environments thereof. If a photostablizer is added at the same time in addition to the ultraviolet absorption agent, the padding material becomes more stabilized against light.

When the solar panel is used under severe operational environments, the bond between the transparent resin and the photovoltaic solar cell or the transparent film is preferably reinforced. The bond therebetween may be reinforced by adding a silane coupling agent or an organic titanate compound to the padding material. The content of the additive is 0.1 to 3 parts by weight to 100 parts of the padding resin and is more preferably 0.25 to 1 part by weight.

To increase the bond between a surface impregnated nonwoven glass fiber and a transparent resin, the addition of a silane coupling agent or an organic titanate compound to the transparent resin is effective.

To minimize a reduction in the amount of light reaching the photovoltaic solar cell, a surface lamination material must be transparent. Specifically, the surface lamination material preferably has a light transmissivity of 80% or more within a visible light range from 400 nm to 800 nm. More preferably, the surface lamination material has a light transmissivity of 90% or more. To facilitate the entrance of light from the atmosphere, the surface lamination material has a refractive index of 1.1 to 2.0 at a temperature of 25° C. and more preferably, has a refractive index of 1.1 to 1.6.

Outer Housing

There is no particular limitation to the outer housing of the solar panel. As reinforcement, a frame or a bottom surface reinforcement member is preferably used. Such a reinforcement material reinforces the solar panel in mechanical strength, thereby preventing the solar panel from being distorted or bowed due to temperature changes. In accordance with the present invention, the outer housing preferably includes a conductor section at least on part thereof. The outer housing is preferably electrically conductive. The portion of the outer housing being electrically conductive is referred to as the conductor section of the outer housing.

The material of the outer housing, as the frame or the bottom surface reinforcement member, may be, but is not limited to, aluminum, stainless steel, zinc-plated steel sheet, galbarium steel sheet, titanium, or carbon fiber. The surface of the outer housing is preferably coated with a resin such as a polyester resin or acrylic resin. When the outer housing is coated with a resin, the test may be performed by partly removing the surface coating of the housing or the laminate material of the solar panel to expose the conductor section thereof.

When a metal roofing integrated solar panel is employed, the metal plate is bent together with the coated resin or the top most covering material thereon. In this way, the solar panel is treated in the same way as a typical metal roofing material.

Live Electrical Section

The live electrical section collectively refers to a section which is connected to the solar cell and conducts current when the solar panel generates electricity. Specifically, the live electrical section includes a junction member that connects one solar cell to another solar cell, leads of the solar panel, the core of an output cable, terminals of connectors, terminals of a junction box, and a switch.

Withstand Voltage Test

A withstand voltage test is carried out by shorting a positive terminal and a negative terminal of the solar panel or a solar panel array, and then by applying a predetermined voltage between the live electrical section and the outer housing (which refers to the bottom surface reinforcement member, the frame, and ground terminals). This test is intended to verify that the product (the solar panel and the solar panel array) is free from any dielectric breakdown attributed to insulation aging. As for a test method and test apparatus for a withstand voltage test, it is important to apply a direct current across test terminals of an object to be tested. There are no other particular requirements on the test method and test apparatus. Preferably, the test apparatus accepts any setting of an application voltage, an application time, an insulation breakdown current, and a voltage ramp. The test apparatus preferably has a function of applying a voltage between test terminals (i.e., a function of supplying a voltage between the conductor section of the outer housing and the live electrical section).

Insulation Resistance Test

An insulation resistance test is carried out by shorting a positive terminal and a negative terminal of a solar panel or a solar panel array, and then by applying a predetermined voltage between the live electrical section and the outer housing (which refers to the bottom surface reinforcement member, the frame, and ground terminals). This test is intended to verify that the solar panel or the solar cell array has insulation high enough to reduce the possibility of fire and electrocution hazards. There are no other particular requirements on the test method and test apparatus. Preferably, the test apparatus includes the function of discharging a charge accumulated during the resistance test of the insulation resistance having a capacitive component. Specifically, one of the following test apparatuses may be used: insulation resistance testers 3118, 3119, 3451, 3452, and 3453 manufactured by Hioki E. E. Corp., Nagano, Japan, and insulation resistance testers 2426A, 3213A, 2406E, 2407, and 2406D manufactured by Yokogawa Electric, Tokyo, Japan. The test apparatus preferably has a function of applying a voltage between test terminals (i.e., a function of supplying a voltage between the conductor section of the outer housing and the live electrical section) subsequent to the test.

Method of Applying a Voltage

As a method of applying a voltage between the conductor section of the outer housing and the live electrical section subsequent to the withstand voltage test or the insulation resistance test, an alternating current voltage is preferably applied between the test terminals. There are no particular limitations to the amplitude and the frequency of the voltage, but the amplitude and the frequency of the voltage are preferably determined considering an object to be measured. The use of a smaller voltage is preferred.

The alternating current voltage may be supplied from a utility power or from an alternating current power supply. Alternatively, the alternating current voltage may be supplied from an oscillator circuit operated from a direct current power supply. The manner of applying the alternating current voltage is not limited to these methods, however. The voltage to be applied between the conductor section of the outer housing and the live electrical section may be a triangular wave or rectangular-wave. The triangular-wave or rectangular-wave voltage is applied between the test terminals across which a residual charge must be lowered. There are no requirements on the amplitude and the frequency of the voltage, and there are no specific requirements on a triangular-wave generator or a rectangular-wave generator.

The present invention is now discussed referring to embodiments, although the present invention is not limited to these embodiments.

First Embodiment

FIG. 1 is a block diagram of a setup for a withstand voltage testing of a solar panel in a production system of the solar panel in accordance with a first embodiment of the present invention. FIG. 2 diagrammatically shows the solar panel of FIG. 1. FIG. 3 is a sectional view of the solar panel of FIG. 2. As shown, the production system includes the shorting wire 104 for shorting a positive connector 102 and a negative connector 103 in a solar panel 101, the switch 105 connected to the shorting wire 104 and the conductor section 108 of the outer housing (a bottom surface reinforcement member 302) of the solar panel 101, and the withstand voltage tester 106 connected to the switch 105. Subsequent to the withstand voltage test, the switch 105 is turned so that the voltage supplier 107 reduces the residual charge in the solar panel 101.

In the solar panel 101 as shown in FIG. 3, the padding material 303 encapsulates and supports the solar cell 304 on a bottom surface reinforcement member 302 as the outer housing. The solar panel 101 is then coated with a weather resistant transparent film 305. A terminal box 306 and a terminal box 307 are glued onto the bottom surface reinforcement member 302 to cover the positive electrode and the negative electrode. Lead wires 308 and 309 with respective connectors connected to the positive and negative electrodes are routed out therefrom.

Figure 4:
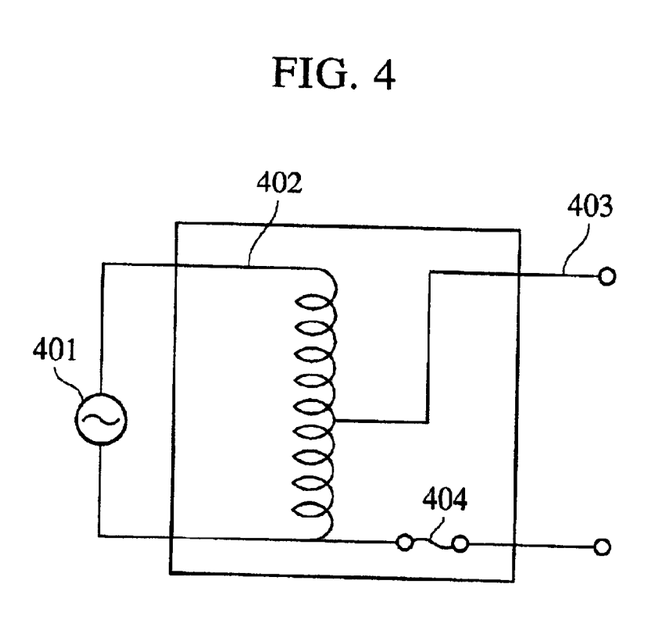
FIG. 4 is a circuit diagram of an alternating current generator as a voltage supplier shown in FIG. 1.

FIG. 4 shows one example of the voltage supplier 107. The voltage supplier 107 shown in FIG. 4 generates an alternating current voltage. A 100 V utility power line 401 is connected to an output terminal 403 through an autotransformer 402. The 100 V utility power line 401 is also connected to a fuse 404.

The withstand voltage test of the solar panel 101 using the withstand voltage tester 106 in the manufacture and testing of the solar panel 101 is discussed next with reference to FIG. 1. The switch 105 is turned to terminals a. The withstand voltage test is performed with test conditions of 2.2 kV voltage with a rate of increase of 500 V/s for a voltage application time of 1 minute. When the voltage between the test terminals (the voltage between the outer housing and the live electrical section) drops to a predetermined reference voltage after the confirmation that the solar panel 101 passes the test, the switch 105 is turned to the terminals b. A 1 V alternating current voltage is applied to the voltage supplier 107, and the residual charge is removed from the solar panel 101. The withstand voltage test is then followed by a next inspection step or a next manufacturing step.

In accordance with the present invention, the residual charge from the withstand voltage test is easily removed within a short period of time by applying an alternating current voltage. The production efficiency of the solar panel 101 is increased. Since the residual charge is reliably reduced, the generation of arcs between the live electrical section and the conductor section 108 of the outer housing is controlled. Also, the manufacturing yield of the solar panel 101 is increased. By setting the predetermined reference voltage at which the switch 105 is turned high, the required measurement time is shortened.

Second Embodiment

Figure 5:
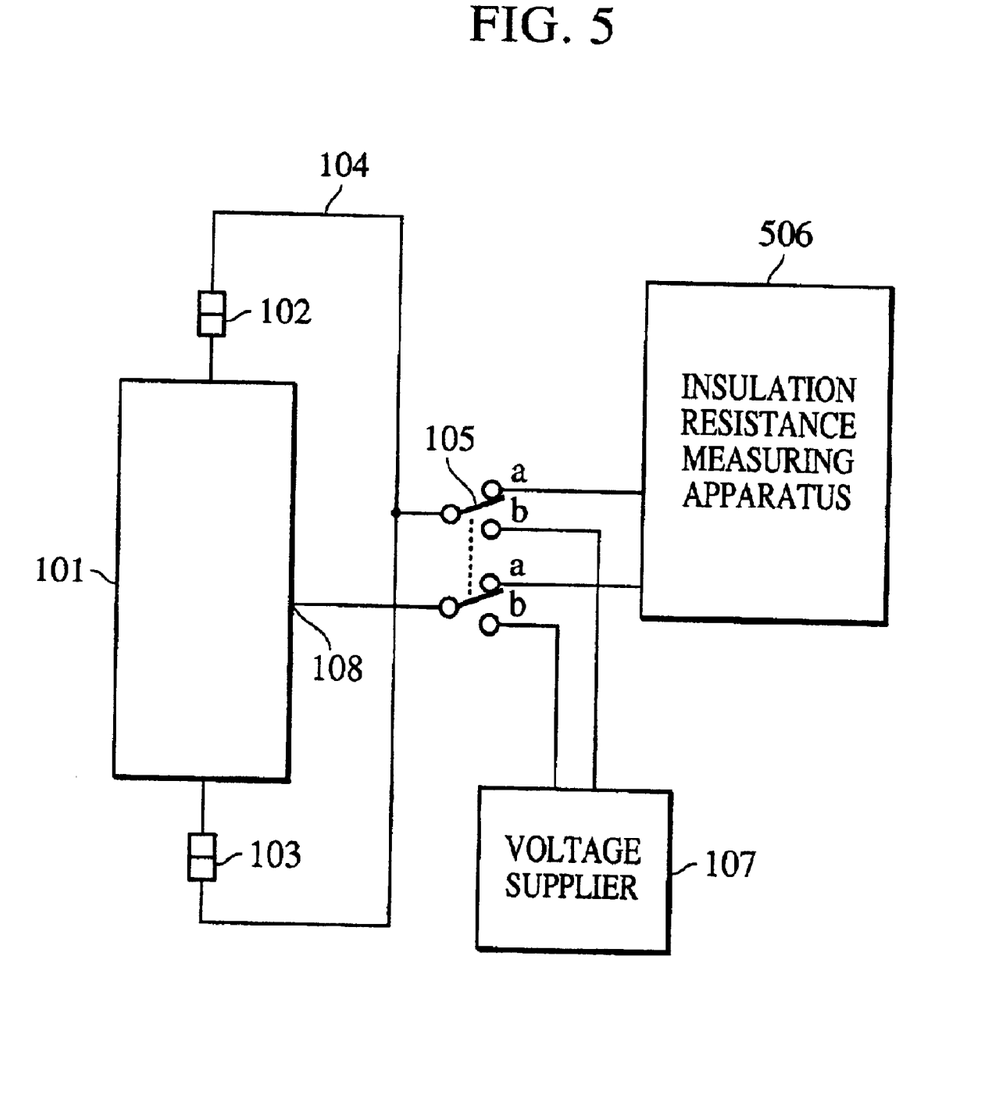
FIG. 5 is a block diagram of a setup for an insulation resistance measuring of a solar panel in accordance with a second embodiment of the present invention.

FIG. 5 is a block diagram of a setup for an insulation resistance testing of a solar panel in a production system of the solar panel in accordance with a second embodiment of the present invention. The difference from the setup shown in FIG. 1 is that the switch 105 is connected to an insulation resistance measuring apparatus 506 instead of the withstand voltage tester 106. The rest of the construction remains unchanged from the setup shown in FIG. 1.

Discussed next is the insulation resistance test of the solar panel 101 in the manufacture and testing of the solar panel 101. The switch 105 is turned to terminals a. The insulation resistance test is performed using the insulation resistance measuring apparatus 506 and under test conditions of an application voltage of 500 V for an application time of 1 minute. The insulation resistance measuring apparatus 506 with the automatic discharging function thereof causes the voltage across the terminals (the voltage between the conductor section of the outer housing and the live electrical section) to drop down to a predetermined reference voltage. The switch 105 is then turned to the terminals b, thereby applying a 1 V and 60 Hz alternating current to the solar panel 101 from the voltage supplier 107. In this way, the residual discharge is removed from the solar panel 101. Then, the manufacturing process proceeds to a next inspection step or a next manufacturing step.

In accordance with this embodiment, the residual charge from the insulation resistance test is easily removed within a short period of time by applying the alternating current voltage. The production efficiency of the solar panel 101 is increased. Since the residual charge is reliably reduced, the generation of arcs between the live electrical section and the conductor section 108 of the outer housing is controlled. The manufacturing yield of the solar panel 101 is increased. By setting the predetermined reference voltage at which the switch 105 is turned high, the required measurement time is shortened.

Third Embodiment

Figure 6:
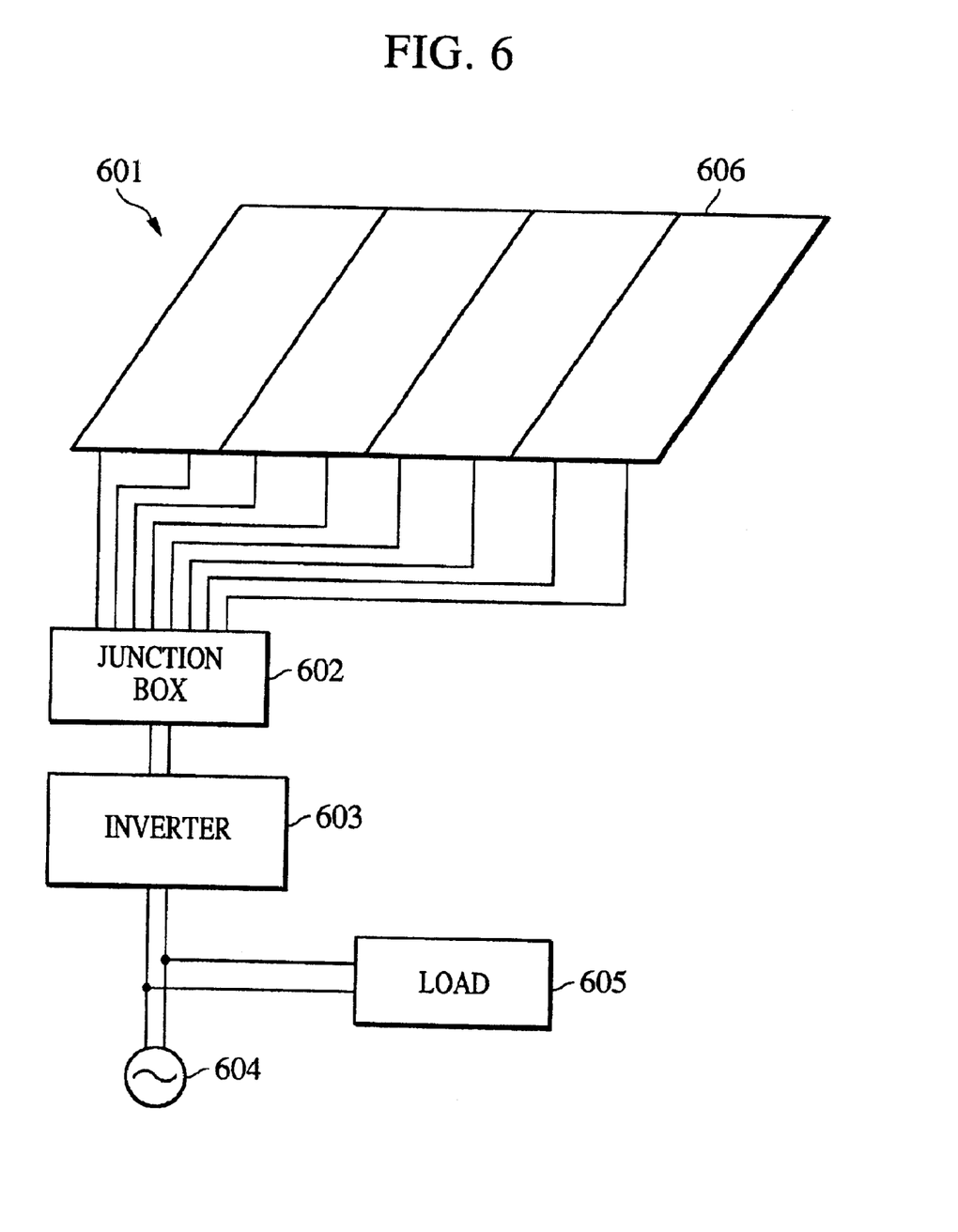
FIG. 6 is a block diagram showing a solar panel generating system that is inspected by an insulation resistance measuring apparatus shown in FIG. 7A.
Figure 7A:
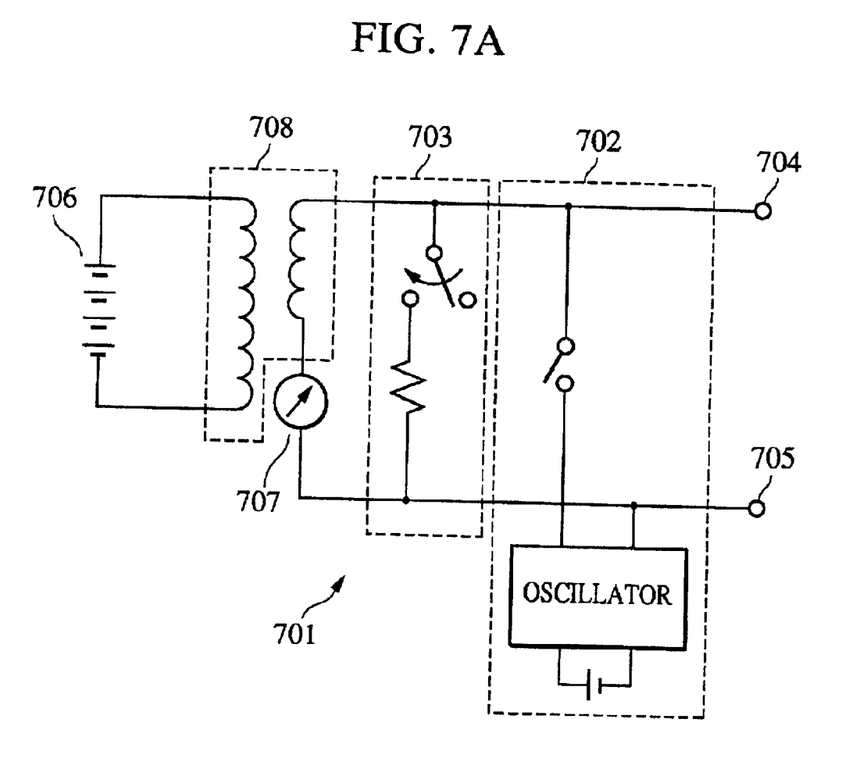
FIG. 7A is a circuit diagram of the insulation resistance measuring apparatus in accordance with a third embodiment of the present invention.
Figure 7B:
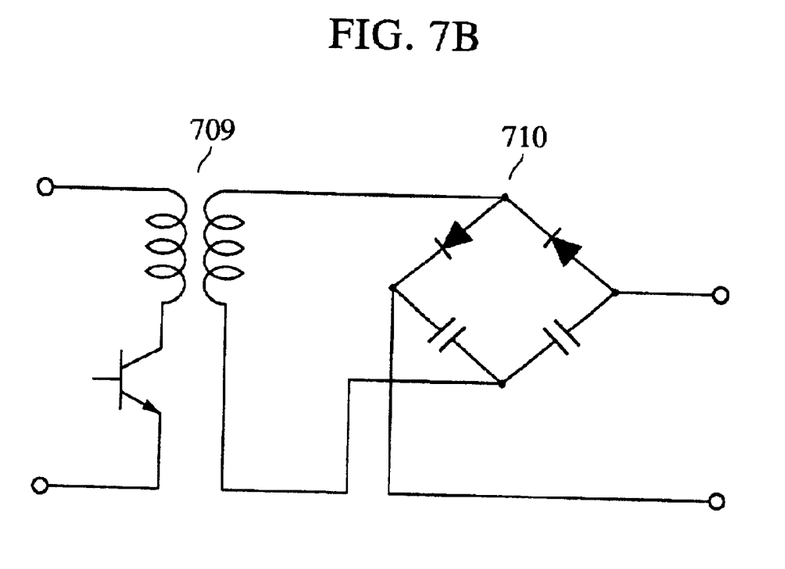
FIG. 7B is a circuit diagram of an oscillating and voltage step-up transformer and a voltage doubler smoothing circuit in the insulation resistance measuring apparatus shown in FIG. 7A.

FIG. 7A shows an insulation resistance measuring apparatus 701 in the maintenance and inspection system for a solar panel generating system in accordance with a third embodiment of the present invention. FIG. 7B is a circuit diagram of an oscillating and voltage step-up transformer and a voltage doubler smoothing circuit in the insulation resistance measuring apparatus shown in FIG. 7A as reference numeral 708. As shown, the insulation resistance measuring apparatus 701 includes a voltage supplier 702 and an automatic discharger 703. The insulation resistance measuring apparatus 701 is used to measure the insulation resistance of a solar panel generating system shown in FIG. 6 composed of an array of solar panels 101 shown in FIG. 1 during inspection and maintenance. Referring to FIG. 7A and FIG. 7B, there are shown a positive probe 704, a negative probe 705, a battery 706, an insulation resistance meter 707, an oscillating and voltage step-up transformer, voltage doubler and smoothing circuit 708, an oscillating and voltage step-up transformer 709, and a voltage doubler and smoothing circuit 710. In the insulation resistance measuring apparatus 701, a direct current voltage of the battery 706 is converted and stepped up into an alternating current voltage by the oscillating and voltage step-up transformer 708. The alternating current voltage is then rectified and smoothed by the voltage doubler and smoothing circuit 710. The resulting voltage is then applied to the solar panel or the solar panel array for insulation resistance measurement.

Referring to FIG. 6, there is shown a solar panel generating system 601, which is inspected and maintained using the insulation resistance measuring apparatus 701, and which is composed of four solar panels. The output lines of a solar panel array 606 are routed into a junction box 602. Electricity collected there is converted into an alternating current voltage through an inverter 603. The resulting alternating current voltage is then fed back to the utility power line 604 or consumed by a load 605.

Figure 8:
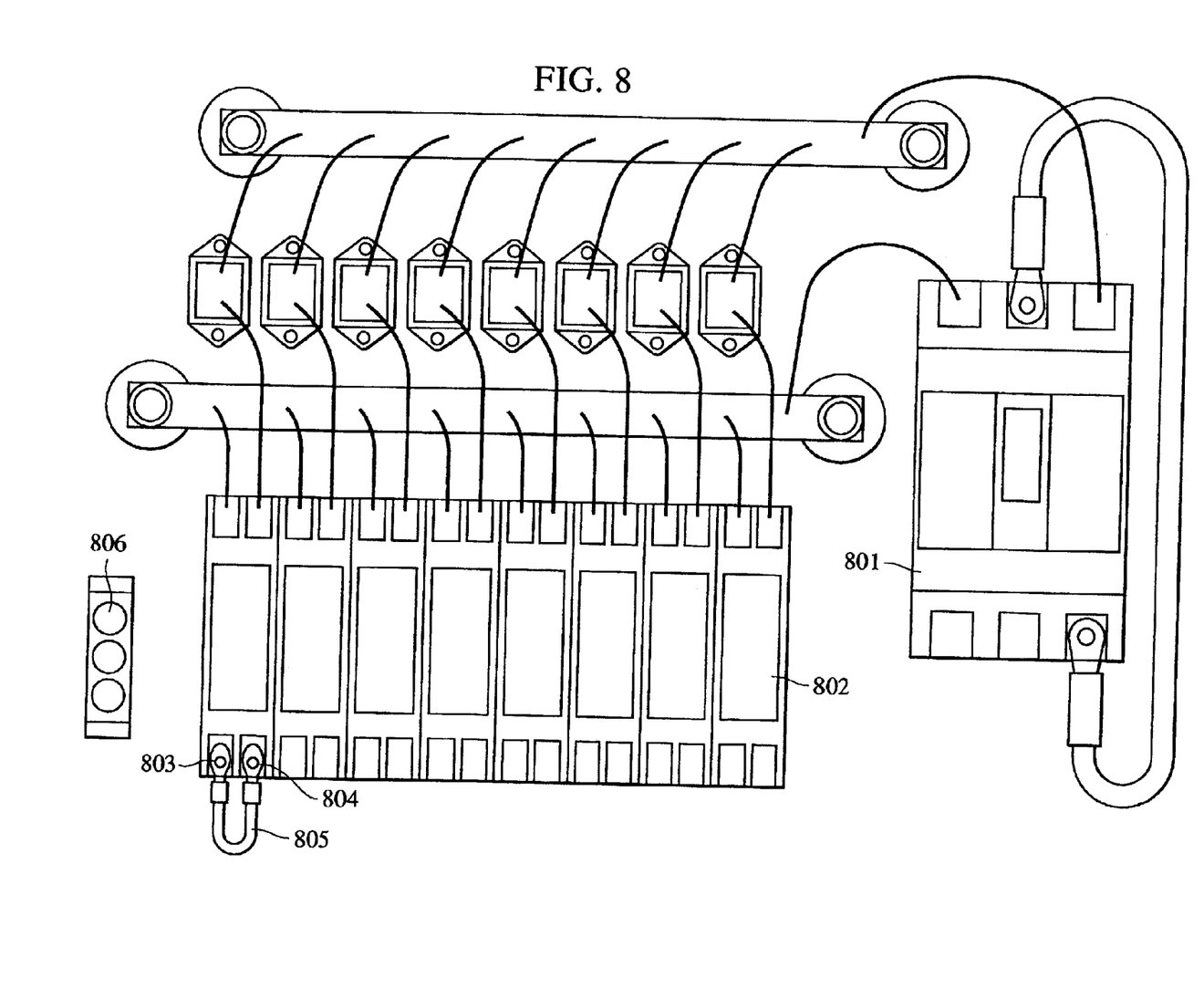
FIG. 8 is an internal view of a junction box shown in FIG. 6.

FIG. 8 shows the wiring in the junction box 602. The junction box 602 includes a main switch 801 and circuit breakers 802 for respective solar panels.

To perform inspection and maintenance, the main switch 801 is first opened, followed by the opening operation of all circuit breakers of the solar panel array 606. A shorting wire 805 is used to short a positive terminal 803 to a negative terminal 804 in one solar panel of the array 606. The circuit breaker 802 of the one solar panel is closed. The negative probe 705 in the insulation resistance measuring apparatus 701 is connected to a ground terminal 806 in the junction box 602, and the positive probe 704 in the insulation resistance measuring apparatus 701 is connected to the positive terminal 803. The insulation resistance measurement is performed with an application voltage of 250 V for an application time of 1 minute. When the main switch of the insulation resistance measuring apparatus 701 is turned off subsequent to the end of the measurement, the automatic discharger 703 performs the automatic discharging function thereof. When the voltage drops down to the predetermined reference voltage, the switch is automatically turned to apply the alternating current voltage to the solar panel from the voltage supplier 702. The residual charge in the solar panel array 606 is thus reduced through a series of insulation resistance measuring apparatuses 701.

In this sequence, the inspection and maintenance process is performed by measuring the insulation resistance of the solar panel array 606.

In accordance with the third embodiment, the residual charge from the insulation resistance measurement is thus easily and quickly reduced by applying the alternating current voltage. The time required for the inspection and maintenance is shortened. With the residual charge thus reliably reduced, the insulation resistance is more accurately measured.

Fourth Embodiment

Figure 9:
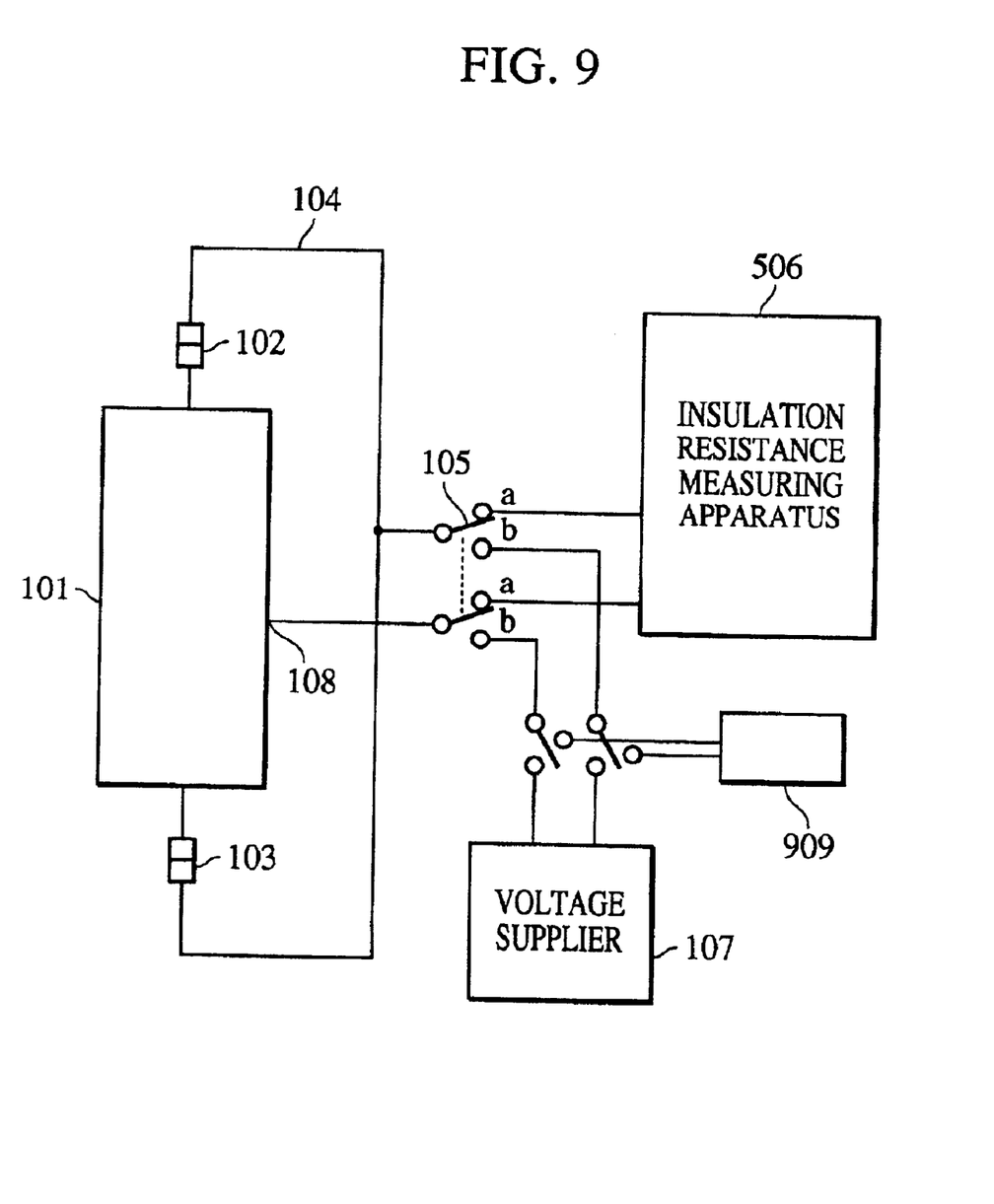
FIG. 9 is a block diagram of an insulation resistance measuring apparatus in accordance with a fourth embodiment of the present invention.

FIG. 9 is a circuit diagram showing a setup for an insulation resistance testing of a solar panel in accordance with a fourth embodiment of the present invention. The arrangement shown in FIG. 9 remains unchanged from that shown in FIG. 5, except that a voltage meter 909 is arranged between the switch 105 and the voltage supplier 107 to measure the voltage between the terminals (the voltage between the conductor section of the outer housing and the live electrical section). Five solar panels 101 are connected in series, and the bottom surface reinforcement plates are electrically connected to each other.

With this arrangement, an insulation resistance test is performed in a procedure substantially similar to the one adopted in the second embodiment, under the test conditions of an application voltage of 250 V for a voltage application time of 1 minute. The probes of the insulation resistance measuring apparatus 506 are left connected to the terminals after the measurement. The switch 105 is then turned after verifying that the voltage across the terminals drops down to 10 V or less by the insulation resistance measuring apparatus 506 with the automatic discharging function thereof. The voltage from the voltage supplier 107 is then applied to the solar panel. The voltage across the terminals is then measured every 10 seconds until 180 seconds have elapsed. The voltage conditions of the voltage supplier 107, i.e., voltage, frequency, waveforms, and application time of the application voltage are shown at row 4) in Table 1.

Similar insulation resistance tests are performed under the test conditions listed at rows 5) through 7) in Table 1 with the automatic discharging function of the insulation resistance measuring apparatus 506 not activated. The remaining test conditions are unchanged.

COMPARATIVE EXAMPLE

In comparison to the preceding tests, similar insulation resistance tests are performed under the test conditions listed at rows 1) through 3) in Table 1 with no voltage applied from the voltage supplier 107. The remaining test conditions are unchanged.

Figure 10:
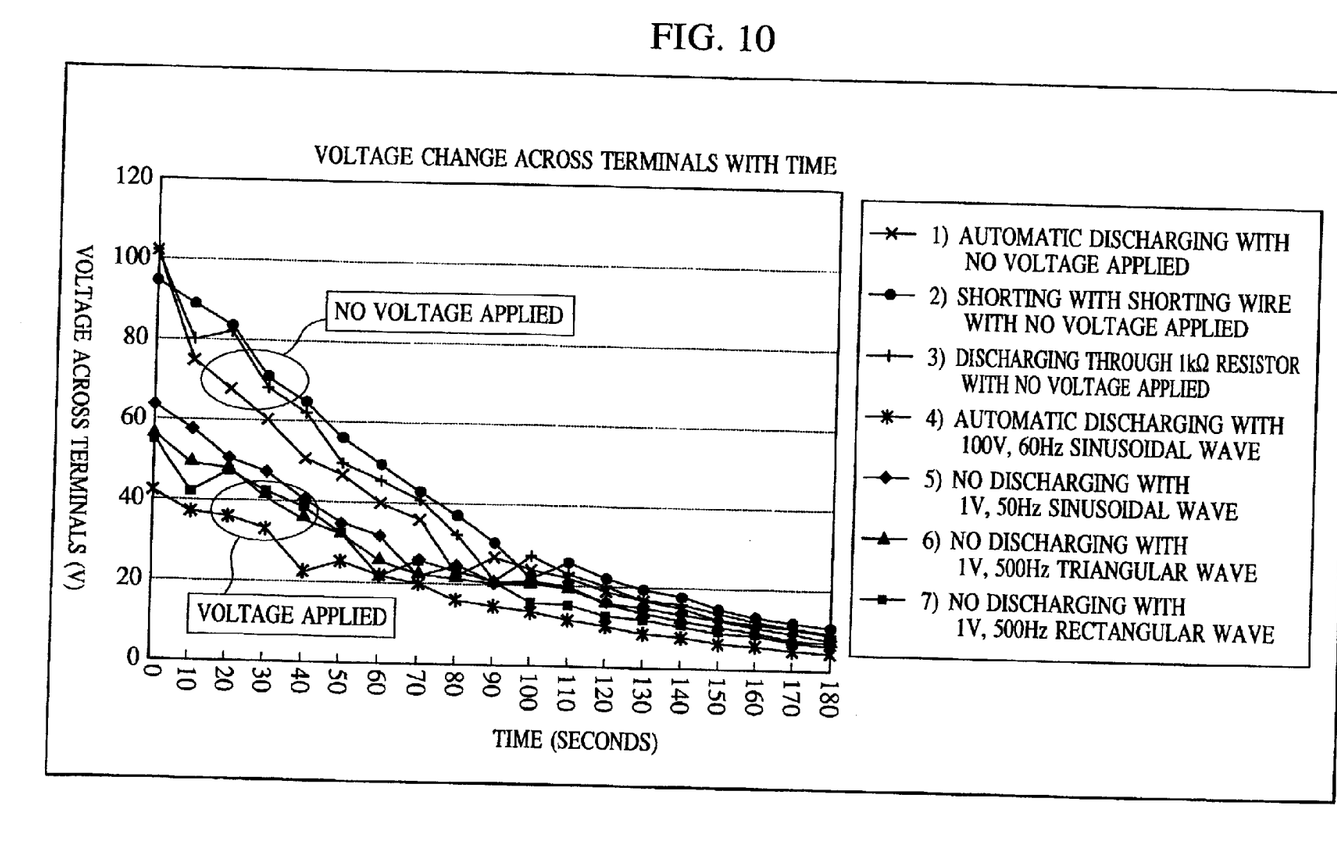
FIG. 10 is a graph illustrating measurement results across terminals (between the conductor of an outer housing and a live electrical section).

Referring to the test results of the terminal voltages shown in FIG. 10 (the voltages between the conductor section of the outer housing and the live electrical section), lines 1) through 3) in the graph in FIG. 10 represent the terminal voltage changes respectively from the start of automatic discharging, the start of discharging using a shorting wire, and the start of discharging using a 1 kohm resistor to a time of 180 seconds. Lines 4) through 7) in the graph shown in FIG. 10 represent the terminal voltage changes from the application of a voltage from the voltage supplier 107 to a time of 180 seconds. As understood from FIG. 10, regardless of the applied voltage waveform, the conditions 4) through 7) with the alternating current voltage applied in accordance with the fourth embodiment result in terminal voltages lower than those resulting from the conditions 1) through 3) in accordance with the comparative example.

As discussed above, the residual charge left from the insulation resistance test or the withstand voltage test is easily and quickly reduced within a short period of time. The present invention thus improves efficiency in the manufacturing of the solar panel and in the inspection and maintenance process of the solar panel generating system. The method of the present invention reliably reduces residual charge, thereby controlling the generation of arcs between the live electrical section and the conductor section of the outer housing. The manufacturing yield of the solar panel is increased. The measurement time is shortened by setting the voltage difference between the live electrical section and the conductor section of the outer housing (the predetermined reference voltage) high, which serves as the determination criteria for shifting to a step of applying a voltage between the live electrical section and the conductor section of the outer housing subsequent to the insulation resistance test or the withstand voltage test.

TABLE 1

| | | Method of and presence or absence of discharging | Voltage application conditions |
|---|---|---|---|
| Comparative examples | 1) | Automatic discharging | No voltage applied |
| | 2) | Discharging through shorting wire | No voltage applied |
| | 3) | Discharging through 1 kohm resistor | No voltage applied |
| Embodiment 4 | 4) | Automatic discharging | 100 V, 60 Hz, sinusoidal wave, 3 seconds |
| | 5) | No discharging | 1 V, 500 Hz, sinusoidal wave, 3 seconds |
| | 6) | No discharging | 1 V, 500 Hz, triangular wave, 3 seconds |
| | 7) | No discharging | 1 V, 500 Hz, rectangular wave, 3 seconds |

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A method for testing a solar panel including, at least, both a solar cell and an outer housing, the method comprising:
    performing one of a withstand voltage test and an insulation resistance test between a live electrical section electrically connected to the solar cell and a conductor section of the outer housing, and thereafter
    applying a voltage between the live electrical section and the conductor section.

2. The method according to claim 1, wherein the outer housing is a bottom surface reinforcement member for reinforcing the bottom surface of the solar panel.

3. The method according to claim 1, wherein the solar panel comprises a metal plate.

4. The method according to claim 3, wherein the metal plate is a stainless steel sheet.

5. The method according to claim 1, wherein the voltage applied between the live electrical section and the conductor section of the outer housing is fed from a utility power line.

6. The method according to claim 1, wherein in the performing step, the insulation resistance test is performed.

7. The method according to claim 1, wherein in the performing step, the withstand voltage test is performed.

8. A method for testing a solar panel including, at least, both a solar cell and an outer housing, the method comprising:
    performing one of a withstand voltage test and an insulation resistance test between a live electrical section electrically connected to the solar cell and a conductor section of the outer housing, and thereafter
    applying an alternating current voltage between the live electrical section and the conductor section.

9. A method for inspecting a solar panel generating system including a solar panel including, at least, both a solar cell and an outer housing, the method comprising:
    performing one of a withstand voltage test and an insulation resistance test between a live electrical section electrically connected to the solar cell and a conductor section of the outer housing, and thereafter
    applying a voltage between the live electrical section and the conductor section.

10. An apparatus for testing a solar panel including, at least, both a solar cell and an outer housing, the apparatus comprising:
    a means for performing one of a withstand voltage test and an insulation resistance test between a live electrical section electrically connected to the solar cell and a conductor section of the outer housing, and
    a means for applying a voltage between the live electrical section and the conductor section after the one of the withstand voltage test and the insulation resistance test has been performed.

11. The apparatus according to claim 10, wherein the outer housing is a bottom surface reinforcement member for reinforcing the bottom surface of the solar panel.

12. The apparatus according to claim 10, wherein the solar panel comprises a metal plate.

13. The apparatus according to claim 12, wherein the metal plate is a stainless steel sheet.

14. The apparatus according to claim 10, wherein the voltage applied between the live electrical section and the conductor section of the outer housing is fed from a utility power line.

15. The apparatus according to claim 10, wherein the means for performing performs the insulation resistance test.

16. The apparatus according to claim 10, wherein the means for performing performs the withstand voltage test.

17. An apparatus for testing a solar panel including, at least, both a solar cell and an outer housing, the apparatus comprising:
    a means for performing one of a withstand voltage test and an insulation resistance test between a live electrical section electrically connected to the solar cell and a conductor section of the outer housing, and
    a means for applying an alternating current voltage between the live electrical section and the conductor section after the one of the withstand voltage test and the insulation resistance test has been performed.

18. An apparatus for inspecting a solar panel generating system including a solar panel including, at least, both a solar cell and an outer housing, the apparatus comprising:
    a means for performing one of a withstand voltage test and an insulation resistance test between a live electrical section electrically connected to the solar cell and a conductor section of the outer housing, and
    a means for applying a voltage between the live electrical section and the conductor section after the one of the withstand voltage test and the insulation resistance test has been performed.

19. A method for manufacturing a solar panel including, at least, a solar cell, a surface protective covering member for encapsulating the solar cell, and an outer housing, the method comprising:
    encapsulating the solar cell with the surface protective covering member;
    performing one of a withstand voltage test and an insulation resistance test between a live electrical section electrically connected to the solar cell and a conductor section of the outer housing; and thereafter applying a voltage between the live electrical section and the conductor section.

20. A method for manufacturing a solar panel including, at least, a solar cell, a surface protective covering member for encapsulating the solar cell, and an outer housing, the method comprising:

encapsulating the solar cell with the surface protective covering member;

performing one of a withstand voltage test and an insulation resistance test between a live electrical section electrically connected to the solar cell and a conductor section of the outer housing; and thereafter applying an alternating current voltage between the live electrical section and the conductor section.

* * * * *